United States Patent [19]
Sesto

[11] 3,825,385
[45] July 23, 1974

[54] SELF-CONTAINED DIE PROTECTING DEVICE

[75] Inventor: Peter Joseph Sesto, Redondo Beach, Calif.

[73] Assignee: G & S Mold & Die, Inc., Hawthorne, Calif.

[22] Filed: Mar. 22, 1972

[21] Appl. No.: 237,160

[52] U.S. Cl. ............................... 425/137, 164/152
[51] Int. Cl. ............................................ B28b 17/00
[58] Field of Search ........................ 425/135–139, 425/153, 154; 164/347, 152, 153, 154

[56] References Cited
UNITED STATES PATENTS

| | | | |
|---|---|---|---|
| 2,301,819 | 11/1942 | Sambrook | 164/347 X |
| 2,304,899 | 12/1942 | Dupre | 164/347 |
| 2,533,035 | 12/1950 | Morin | 164/153 |
| 2,558,027 | 6/1951 | Wilson | 164/347 X |
| 2,994,115 | 8/1961 | Schuchardt | 164/153 |
| 3,040,399 | 6/1962 | Raffaelli | 164/152 X |
| 3,137,905 | 6/1964 | Steinman | 164/347 |
| 3,310,841 | 3/1967 | Hehl | 164/153 X |
| 3,564,657 | 2/1971 | Aoki | 425/154 X |
| 3,572,424 | 3/1971 | Byrne | 164/347 |

Primary Examiner—J. Spencer Overholser
Assistant Examiner—John S. Brown
Attorney, Agent, or Firm—Smyth, Roston & Pavitt

[57] ABSTRACT

A safety device for the protection of dies such as those used in injection molding operations. One of the die blanks is formed in two sections which are mounted for limited movement relative to one another and spring-biased apart which can be set to any degree of sensitivity by different spring tensions. The other die blank is provided with an ejector plate mounted in the rear portion thereof so that ejector pins normally extended into the mold cavity in order to eject finished products therefrom. The die blanks are mounted on press platens so that they may be moved relative to one another. When the die is closed, the ejector pins are forced out of the mold cavity. A pair of switches are attached to the die blanks in such a way that if any flashing or other foreign material should fail to be ejected from the mold cavity, should fall between the die blanks, or should get behind the ejector plate, the relative movement of the blanks will automatically be reversed before substantially any damage can occur to the die.

12 Claims, 1 Drawing Figure

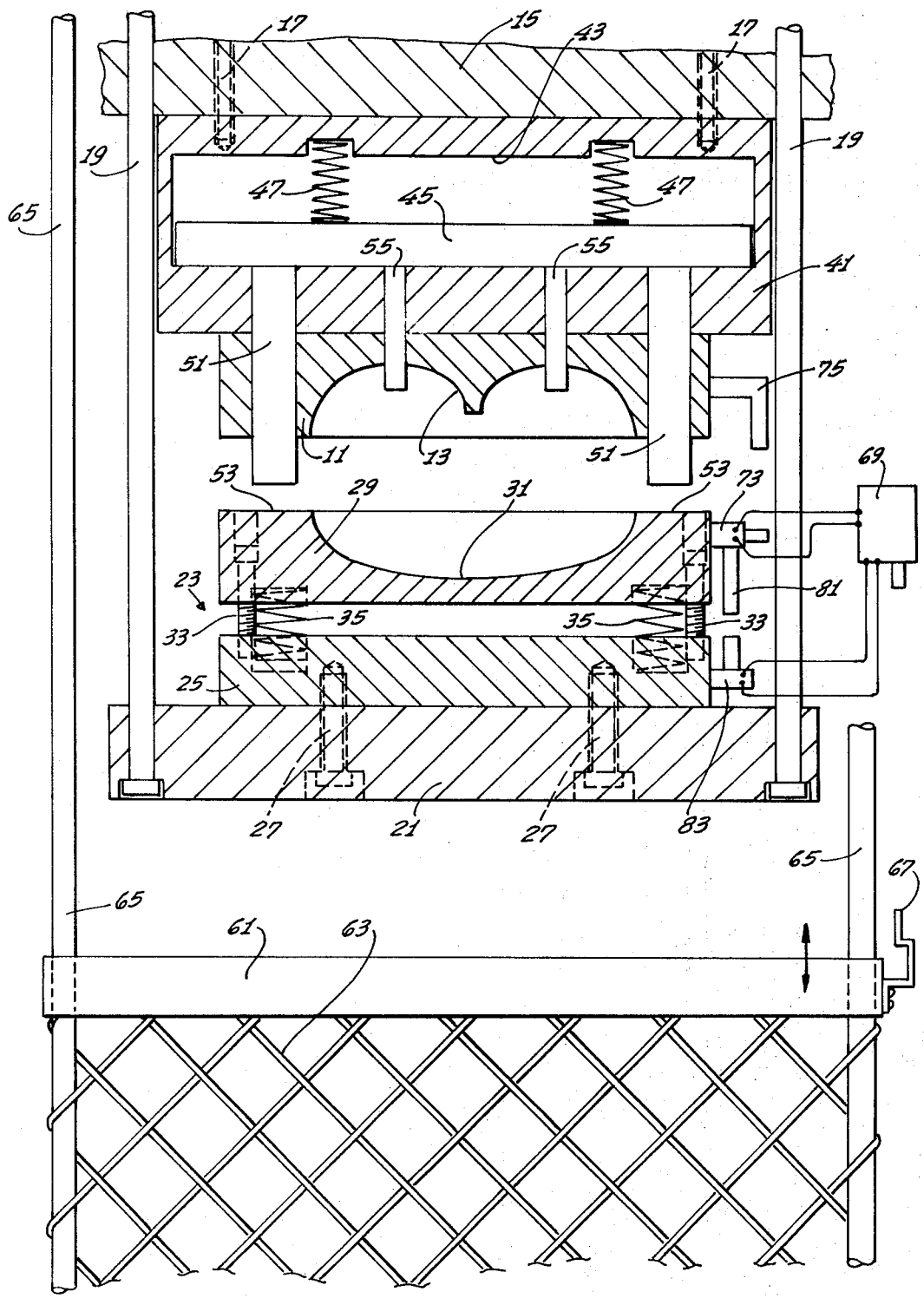

SELF-CONTAINED DIE PROTECTING DEVICE

BACKGROUND OF THE INVENTION

In the field of injection molding, a pair of die blanks are brought together by any suitable means such as a press having a pair of platens which may be moved relative to one another. When the die blanks are brought together, closing the die, a suitable plastic substance may be injected into the cavity formed between the blanks, filling it. As the injected material cools, it solidifies and is thus formed into the configuration determined by the mold cavity. The die sections are then separated and the mold is voided in order to allow the commencement of the next injection cycle.

In some instances, one or both of the die halves may be provided with an ejector device in order to ensure removal of the molded product from the die at the end of each injection cycle. The die half may be provided with an aperture or slot near the rear of the die into which an ejector plate may be properly positioned for movement toward and away from the die cavity. A plurality of ejector bars may extend from the ejector plate, through suitable bores in the body of the die blank, and into the cavity. Biasing springs or similar devices may be positioned between the rear surface of the slot and the ejector plate so that the ejector bars normally extend into the die cavity. A plurality of rods, fastened to the ejector plate, extend beyond the leading edge of the die blank about the periphery of the mold cavity so that, when the die is closed, the rods will be retracted into the blank by contact with the face of the second die blank, thereby driving the ejector plate toward the rear of the slot and causing withdrawal of the ejector pins from the mold cavity.

Such injection systems have been subject to serious and costly damage if the die blanks are brought together when their interface surfaces are not completely free of all flashing, residue, or foreign objects. In addition to improper alignment of the dies, with a consequent waste of material and the molding of imperfect products, the interface surfaces of the die blanks can become damaged and marred in view of the high pressures utilized to hold them together during injection. Since such machines must be rather precisely aligned at all times in order to create a proper die closure, even the slightest misalignment can cause damage to the machine itself and to the die blanks. This is not only costly to repair in terms of replacing the dies, but is also costly in that many of these machines operate automatically and a large number of defective moldings can be formed before an operator notices the problem.

Additionally, if foreign objects become lodged in the ejector plate slot, they will prevent the ejector plate from being able to travel freely within its slot. For example, if a small nut or piece of flashing should get behind the ejector plate, it will prevent the ejector plate from being able to withdraw fully and pull the ejector pins out of the die cavity. Unless the machine is stopped immediately, the high pressures generated to close the die will cause the ejector pins, the ejector retraction bars, and the die halves themselves to become so severely damaged as to require replacement. For example, the pressures can cause the rods and/or pins to be bent relative to their axes. This, of course, will prevent the ejector from operating again and will very likely cause the die blanks to be damaged as a result of the contact with the rods or pins.

Therefore, it has become very important to provide a safety mechanism which will prevent the press from closing the die unless the area between the die blanks and the ejector plate slot are completely free of all foreign and undesired objects.

In the past, it has been proposed that the interface area between the die blanks could be protected by mounting each of the blanks on a movable platen. One of the movable platens would be actuated by a standard press or hydraulic system and the other movable platen would be mounted on a fixed base but biased away from the base by a set of springs. Thus, when the actuated platen drove its die blank toward the "fixed" die blank to close the die, the "fixed" platen would be driven against the force of its biasing springs into contact with its fixed base. In that structure, a switch would be mounted on the fixed base which could be operated by an actuator attached to the "fixed" spring-biased platen. A second switch could be mounted on the spring-biased platen which would be operated by an actuator attached to the hydraulically driven platen of the press.

Such devices are provided with relatively complex control circuitry requiring that the switch of the fixed base be a normally open switch and that the switch on the spring biased platen be a normally closed switch. The open switch on the fixed base is wired so as to be a part of relatively complex reversing circuits. When the die halves are brought together with no foreign objects between them, the normally closed switch on the biased platen is opened, eliminating the normally open switch on the fixed base from the reversing circuit. On the other hand, if there is a foreign object between the die halves when they are brought together, the normally closed switch on the biased platen will remain closed. When the biased platen is driven toward the fixed base, the normally open switch on the latter will be closed and the reversing circuit will be operated. This will cause the hydraulically driven platen to be withdrawn to prevent the exertion of significant pressures between the die blanks.

These prior art systems have proven to be relatively unsatisfactory because they require the utilization of sophisticated hydraulic and electrical circuitry on the machine and are not adaptable for machines which are not manufactured with these items as original equipment. If it is desired to use a device such as the prior art has provided, it can be used only with the machine upon which it is originally manufactured and installed. In other words, the protection device is not susceptible to being transferred from machine to machine in an economical and efficient manner.

Thus there has long existed a need for a die protection system which will prevent the exertion of the normal closing pressures used with die blanks when foreign matter becomes lodged between the blanks or behind an ejector system which must be withdrawn to remove the ejector pins from the die cavity. Ideally, such a need would be fulfilled by a system which is relatively simple and inexpensive and can be quickly and easily installed on any available press or molding machine without requiring a significant amount of down time of such a machine. In order to allow such a system to be transferred from machine to machine, it would also be preferable to provide such a protection device which adequately protects the die blanks through the use of the normal safety features found on injection machines.

SUMMARY OF THE INVENTION

The present invention relates to a safety feature for use with closable die halves or blanks which will prevent the exertion of any damaging die-closing pressures if any foreign objects should become lodged between the die blanks or within an associated ejector system so that the ejector cannot be fully withdrawn.

More specifically, the invention relates to a relatively simple sequential switching system which may be attached directly to a pair of die blanks and quickly and efficiently connected to the safety circuits built into such injection machines by the manufacturers without requiring any alteration thereof.

Such a device can be quickly and simply moved from one machine to another merely by removing the die and disconnecting its switches from the first machine and installing it and reconnecting its switches to the second.

The device may be used with a pair of die blanks, one of which is fastened to a hydraulically actuated platen. The other die blank may be manufactured in two sections, one fastened directly to a fixed platen and the other biased away from the fixed section within predetermined limits.

Each one of a pair of normally open switches may be attached to one section of the two-section die blank, in one embodiment. However, it is important only that the switches be located so as to be closed when the die is closed and when the gap in the two-section die blank is closed.

In operation of this particular embodiment, an actuator may, for example, be fastened to the die blank mounted on the actuated platen. The actuator may be used to close the contacts of the switch attached to the spring biased blank section, if no foreign objects are present between the blanks or within the ejector system. On the other hand, if such a foreign object is present, the switch on the biased section cannot possibly be actuated until after the actuated platen drives the die blank attached thereto into contact with the biased platen and the latter begins to move against the force of its springs into contact with its fixed die section. Prior to this being accomplished, however, the switch attached to the fixed section will be closed by an actuator attached to the biased section.

In most presently available injection machines, a finger guard must be closed before the machine can be actuated in order to protect the operator from injury. When the guard is closed, a switching relay or similar device is usually actuated which allows the die closing system to be fully operated when the operator starts the machine. On the other hand, when the finger guard is not closed, the latter switching system will not be actuated and the driven platen is maintained in the withdrawn position by the machine. In accordance with the presently preferred embodiment, if the switch attached to the fixed section of the die blank mounted on the fixed platen is closed prior to the closing of the switch mounted on the biased section, the switching relay associated with the finger guard will automatically be opened, thereby preventing the machine from being operated.

Thus it will be realized by those skilled in the art that the safety features provided by the present invention may readily and easily be incorporated with any die structure. As a result, the dies may be thought of as providing their own protection without requiring any major modification of the injection machine itself. The only change which would be required in such a machine would be the proper connection of the die protection switches into the finger guard switching relay circuit. This may require, from a practical standpoint, the mere connection of three or four wires to readily available terminals on the machine.

It will also be realized by those skilled in the art that the following Detailed Description has been directed to a single preferred embodiment of the invention merely for the sake of illustrating the concepts thereof. Many additional embodiments, alterations, and/or modes of the invention will become apparent upon reading the following description together with the accompanying drawing which illustrates what is presently considered to be the preferred embodiment. However, such modifications and alterations as will thus become apparent are intended to be within the scope of the invention as described and delineated by the claims.

BRIEF DESCRIPTION OF THE DRAWINGS

The FIGURE comprises a view of an injection molding apparatus, partly in section, illustrating the apparatus as being mounted on a readily available press.

DETAILED DESCRIPTION

As shown in the drawing, a first die blank 11, having a suitably configured die cavity 13, may be rigidly mounted upon a platen 15 by any suitable means such as bolts 17. Although the platen 15 may be a fixed platen, in the illustrated embodiment it is illustrated as a hydraulically driven platen which is actuated up and down, in the plane of the paper, by any suitable system (not shown).

The driven platen 15 may be guided for movement along a set of rods 19 which are often located at approximately the corners of the platen. At the ends of the rods 19, a fixed base 21 may be immovably located. The fixed base or platen 21 may be mounted on any suitable rigid structure which prevents it from being moved relative to the position shown.

A second die blank 23 is provided, comprising a first section 25 rigidly attached to the fixed platen 21 by any suitable means, such as bolts 27, and a second movable section 29 having a suitable die cavity 31 therein. Die section 29 may be attached to die section 25 by any desired means such as bolts 33 for limited movement relative thereto.

Section 29 may be biased away from section 25 by any well-known device such as springs 35, which hold the sections apart but do not prevent their being moved into surface-to-surface abutment under pressure.

The "upper" die blank 11 may be attached to or integral with a backup section 41 having a slot 43 machined therethrough. If desired, slot 43 can extend entirely through the backup section 41 so that, if the machine is used horizontally, anything falling within the slot 43 will tend to pass completely through it. An ejector plate 45 may be positioned to slidably move within the slot 43 from the position shown toward the platen 15. The ejector plate can be biased to the illustrated position by any suitable means such as ejector springs 47 which act between the platen and the rear of the slot.

A plurality of retractor bars 51 may be positioned on the ejector plate 45 so that, when the platen 15 is driven downwardly in the plane of the drawing, the ends of the bars will contact the leading surface 53 on the section 29 of the die blank 23. When the rods 51 contact the surface 53, the ejector plate 45 will be driven toward the rear of the slot 43, causing ejector pins 55 to be withdrawn from the cavity 13 to a position in which they are coplanar with the bottom of the cavity.

In operation, actuation of the platen 15 will drive the die blank 11 toward the die blank 23. As the leading ends of the retractor bars 51 enter into contact with the surface 53 of die section 29, the ejector plate 45 will be driven toward the rear of slot 43 until the leading surface of die blank 11 enters into contact with the surface 53 of section 29. Continued movement of the platen 15 will then cause section 29 to move into planar contact with the section 25 against the biasing force of springs 35. In other words, as the die closes, the ejector will be withdrawn from the mold cavity until they are needed again, after the die is opened, to void cavity 13. Of course, it will be realized that a similar ejector could be used with blank 23 to void cavity 31, if desired. The sensitivity of this system can easily be controlled, if desired, by predetermining the tension of spring 35.

It will now be apparent to those skilled in the art that with the structure described thus far any foreign objects which have become lodged between the die blanks 11 and 23 can seriously damage the die blanks as well as prevent the proper molding of any material injected into the die mold cavity formed by cavities 13 and 31. In other words, since the die cannot be properly closed, the die blank cavities cannot be properly mated, the injected material will be able to leak out and be wasted, and the product will be unacceptable.

It will also be apparent to those skilled in the art that if any material gets into the slot 43 behind the ejector plate 45, the retractor bars 51 and the ejector pins 55 cannot be properly withdrawn. Consequently, the severe pressures exerted between movable platen 15 and fixed platen 21 could cause the bars and pins to become bent over, damaging the face and/or the cavity of either or both die blanks.

In many readily available machines, a suitable finger guard 61, often having an expanded metal configuration 63 so that the operator may look through the guard to observe the operation of the machine, is manually movable to cover and protect the entire area between the platens 15 and 21. In the illustrated embodiment, the guard 61 may be moved along a pair of rods 65 until properly positioned. An actuator 67 may be mounted on the guard in such a position as to properly actuate the normal switching circuitry 69 which is furnished as standard equipment on such machines, when the guard is in the closed position.

In order to properly protect the die and the machine from damage and from molding unusable parts, a first, normally open switch 73 may be mounted on the die blank section 29 for actuation by a member 75 suitably located on the die blank 11. Thus, as the die blank 11 is driven into proper planar contact with the surface 53 of section 29, actuator 75 will close the switch 73 which may be suitably connected to the switching circuit 69, allowing the operation of the device to continue.

However, if the blank 11 and section 29 do not close properly—for example, if material is situated between them or behind the ejector plate 45—then switch 73 will not be actuated. Continued downward movement of the platen 15 will cause an actuator 81 to close a normally open switch 83 which may be mounted on the fixed die section 25. Proper wiring of the switches 83 and 73 to the switching circuit 69 will cause the switching circuit 69 to become opened, just as though the finger guard had been withdrawn, if switch 83 closes before switch 73 does. In other words, if foreign materials should get between the die blanks or behind the ejector plate, the switch 83 will close before the switch 73 can close. When this sequence occurs, the switch circuit 69 will be open and the platen 15 will return to the starting position. As a result, the machine and the die will not be damaged and no injected material will be wasted.

It will be noted that this die protection system is substantially self-contained and utilizes only the safety devices normally provided with the basic press. The die can be moved from press-to-press and will always be protected when properly connected thereto.

It will be quickly realized by those skilled in the art that whether the switches 73 and 83 are normally open or normally closed is not material to the invention so long as the sequence of operation is thus controlled to prevent damage to the die. Those skilled in the art will also realize these switches and their actuating means will allow the advantages of this invention to be obtained with any machine available in which provision has already been made for operator safety, regardless of the location of the switches. In other words, the die blanks can be positioned on any machine and connected to the safety circuitry therein without requiring major modification of the machine or excessive down time during the installation of this safety feature.

Further, the exemplary positioning of the switches and actuating members on one die blank section or another is not critical to the invention. Thus, switch 73 for example, could be mounted on die blank 11 and an actuator therefor could be mounted on the section 29. Similarly, switch 83 might be mounted on the section 29 and an actuator therefor properly located on the section 25. Alternatively, switch 73 and actuator 75 could be eliminated entirely and a different switch provided which would be actuated by the complete movement of the ejector plate 45. This switch would, similarly, have to be actuated prior to the actuation of switch 83 or the die would not close.

Consequently, it will be realized that the invention thus described and illustrated relates to a die including a "self-contained" safety system which ensures that both (a) the space between the die blanks and (b) the ejector system are clear of foreign objects prior to the final exertion of high closing forces and plastic injection.

Many other modifications and alterations of the invention, as well as different embodiments and modes thereof will now become readily apparent to those skilled in the art. However, such differences, per se, will not be such as to exceed the scope of the invention as defined in the following claims, wherefore I claim:

1. A die comprising
    a first die blank mounted on one platen of a pair of relatively movable platens and having
        a die cavity therein, an ejector means extending into said mold cavity for evacuation thereof when said die is opened, and means for mounting said ejector means for withdrawal of said ejector means from said die cavity when said die is closed, a second die blank mounted on the other platen of said pair of relatively movable platens and having a first section fixed on said other platen and a second section mounted on said first section for limited movement relative thereto and having a die cavity therein, first means for preventing closure of said die unless predetermined actions have been accomplished by the machine operator, and second means for preventing closure of said die if any foreign object is located between said first and second die blanks or in a position to prevent complete withdrawal of said ejector means, and means interconnecting said first and second preventing means such that, if said second preventing means is actuated, it will actuate said first preventing means just as though the operator had not accomplished the predetermined actions.

2. The die of claim 1 wherein
said second preventing means comprises
at least two switches which must be operated in a predetermined sequence.

3. The die of claim 2 wherein
said at least two switches comprise
a first switch for sensing the proper mating of said die cavities and
a second switch for sensing the abutment of said first and second sections of said second die blank.

4. The die of claim 3 wherein
said first switch also senses the complete withdrawal of said ejector means and said first switch must be actuated before said second switch is actuated to prohibit actuation of said second preventing means.

5. The die of claim 1 wherein
said second preventing means comprises
means for sensing the proper abutment of said first die blank and said second section prior to the abutment of said first and second sections.

6. An injection molding machine comprising
a pair of relatively movable platens,
a first die section mounted on one of said platens,
a second die section mounted on the other of said platens,
means mounted on said machine for protecting an operator thereof when said die sections are being closed and for prohibiting said die sections from being closed unless the operator takes predetermined actions with respect to said protection means,
retractable ejector means extending into at least one of the mold cavities in one of said die sections,
means for sensing the presence of a foreign article between said die sections during closure thereof and for sensing when a foreign article prevents complete retraction of said ejector means during closure of said die sections, and
means actuated by said sensing means for preventing closure of said die sections when a foreign article is sensed to be therebetween and for preventing closure of said die sections when a foreign article prevents full retraction of said ejector means.

7. The machine of claim 6 wherein
said preventing means includes
means cooperating with said protecting means to prevent closure of said die sections in substantially the same manner as though the machine operator had failed to actuate said protecting means.

8. The machine of claim 6 wherein
said protecting means and said preventing means include
switch means which must be operated in a predetermined sequence.

9. A die for injection molding comprising
a first die section having
a portion of a mold cavity and
ejector means reciprocatably mounted in said first die section for extension into said portion of a mold cavity when the die is open and withdrawn therefrom when the die is closed,
a second die section reciprocatably movable relative to said first die section,
at least one of said first and second die sections comprising
a first member which may be fixed to a platen,
a second member movably mounted relative to said first member and having
a portion of a mold cavity therein, and
means for biasing said first and second members apart and normally retaining them in spaced relationship within predetermined limits, and
means for ensuring that said ejector means is completely retracted and that no foreign matter is located between said first and second die sections as they are being closed comprising
first swtich means operatively associated with said first die section for sensing complete withdrawal of said ejector means and
second switch means operatively associated with said die section having said first and second members for sensing abutment of said first and second members, said biasing means so structured as to provide sufficient force for normally prohibiting abutment of said first and second members until said ejector means has been completely retracted so that if said second switch is actuated prior to actuation of said first switch as a result of either incomplete retraction of said ejector means or the presence of foreign material between said die sections, a signal will be generated to prevent further closure of the die.

10. An injection molding die comprising
a first section having
a first portion of a die cavity,
a second section having
a second portion of a die cavity,
ejector means retractably extending into at least one of said portions of the die cavity,
means for first sensing that said ejector means is completely retracted from its associated portion of the die cavity and next sensing that said first and second portions of said cavity are properly mated to close said die cavity, and
means for creating a signal to stop the closure of said die cavity if the retraction of said ejector means is not sensed prior to the time that at least partial closure of said die is sensed.

11. The die of claim 10 wherein
at least one of said die sections comprises
first and second relatively movable members, one of which contains the portion of the die cavity and
biasing means for normally holding said first and second members in a predetermined spaced relationship, and
said sensing and signal creating means comprise
actuator and switch means, one of said switch means being actuated by an actuator when said ejectors are completely retracted and another switch means being actuated when said first and second members are in abutment.

12. The machine of claim 6 wherein said sensing means and said preventing means are mounted on said die sections.

* * * * *